(12) United States Patent
Zomet

(10) Patent No.: US 9,035,968 B2
(45) Date of Patent: May 19, 2015

(54) MULTI VIEW DISPLAYS AND METHODS FOR PRODUCING THE SAME

(75) Inventor: Assaf Zomet, Jerusalem (IL)

(73) Assignee: HumanEyes Technologies Ltd., Jerusalem (IL)

(*) Notice: Subject to any disclaimer, the term of this patent is extended or adjusted under 35 U.S.C. 154(b) by 980 days.

(21) Appl. No.: 12/669,495

(22) PCT Filed: Jul. 23, 2008

(86) PCT No.: PCT/IL2008/001017
§ 371 (c)(1),
(2), (4) Date: Jan. 18, 2010

(87) PCT Pub. No.: WO2009/013744
PCT Pub. Date: Jan. 29, 2009

(65) Prior Publication Data
US 2010/0207961 A1    Aug. 19, 2010

Related U.S. Application Data

(60) Provisional application No. 60/951,242, filed on Jul. 23, 2007, provisional application No. 60/979,853, filed on Oct. 14, 2007.

(51) Int. Cl.
*G09G 5/00*    (2006.01)
*G02B 27/22*    (2006.01)

(52) U.S. Cl.
CPC .................................. *G02B 27/2214* (2013.01)

(58) Field of Classification Search
CPC ................ G09G 5/14; G09G 2340/10; G09G 2340/125; G06T 11/60; G06T 15/503

USPC .......... 345/630, 100, 502, 213; 348/448, 452, 348/441, 319, 699, 556, 447, 670; 382/236, 382/254
See application file for complete search history.

(56) References Cited

U.S. PATENT DOCUMENTS

| | | |
|---|---|---|
| 3,538,632 A | 11/1970 | Anderson |
| 5,107,346 A | 4/1992 | Bowers et al. |
| 5,212,546 A | 5/1993 | Arazi et al. |
| 5,363,043 A | 11/1994 | Xiang et al. |
| 5,469,536 A | 11/1995 | Blank |
| 5,494,445 A * | 2/1996 | Sekiguchi et al. ............ 434/365 |

(Continued)

FOREIGN PATENT DOCUMENTS

| | | |
|---|---|---|
| EP | 0897126 | 2/1999 |
| EP | 0999463 | 5/2000 |

(Continued)

OTHER PUBLICATIONS

Communication Pursuant to Article 94(3) EPC Dated Dec. 20, 2012 From the European Patent Office Re. Application No. 08710237.2.

(Continued)

*Primary Examiner* — Abderrahim Merouan

(57) ABSTRACT

A method for creating a distance dependent display that comprises providing an image separating mask having a plurality precision slits arranged in a pattern, generating an interlaced image from a plurality of images according to the pattern, and combining the interlaced image and the image separating mask to allow an observer to view substantially separately each the image from a respective of a plurality of different distances from the image separating mask.

21 Claims, 8 Drawing Sheets

(56) References Cited

U.S. PATENT DOCUMENTS

| | | | | |
|---|---|---|---|---|
| 5,543,965 | A * | 8/1996 | Bielinski et al. | 359/463 |
| 5,583,950 | A | 12/1996 | Prokoski | |
| 5,657,111 | A | 8/1997 | Lo | |
| 5,737,087 | A | 4/1998 | Morton et al. | |
| 5,774,599 | A | 6/1998 | Muka et al. | |
| 5,818,975 | A | 10/1998 | Goodwin et al. | |
| 5,867,322 | A * | 2/1999 | Morton | 359/619 |
| 6,006,041 | A | 12/1999 | Mizumaki et al. | |
| 6,023,557 | A | 2/2000 | Shaklee | |
| 6,026,215 | A * | 2/2000 | Fantone et al. | 358/1.2 |
| 6,144,972 | A | 11/2000 | Abe et al. | |
| 6,327,381 | B1 * | 12/2001 | Rogina et al. | 382/154 |
| 6,445,807 | B1 * | 9/2002 | Katayama et al. | 382/100 |
| 6,476,850 | B1 * | 11/2002 | Erbey | 348/51 |
| 6,569,580 | B2 * | 5/2003 | Campi et al. | 430/5 |
| 6,571,000 | B1 | 5/2003 | Rasmussen et al. | |
| 6,573,928 | B1 | 6/2003 | Jones et al. | |
| 6,628,820 | B2 * | 9/2003 | Oshino et al. | 382/154 |
| 6,687,052 | B1 * | 2/2004 | Wilson et al. | 359/385 |
| 6,690,370 | B2 * | 2/2004 | Ellenby et al. | 345/419 |
| 6,734,847 | B1 | 5/2004 | Baldeweg et al. | |
| 6,831,678 | B1 * | 12/2004 | Travis | 348/46 |
| 7,043,073 | B1 | 5/2006 | Holzbach | |
| 7,058,252 | B2 * | 6/2006 | Woodgate et al. | 385/16 |
| 7,130,864 | B2 | 10/2006 | Lin et al. | |
| 7,190,518 | B1 | 3/2007 | Kleinberger et al. | |
| 7,209,585 | B2 * | 4/2007 | Ashizaki et al. | 382/154 |
| 7,375,886 | B2 * | 5/2008 | Lipton et al. | 359/463 |
| 7,558,421 | B1 | 7/2009 | Holzbach | |
| 7,620,236 | B2 * | 11/2009 | Hirota et al. | 382/154 |
| 7,995,861 | B2 | 8/2011 | Jin et al. | |
| 8,144,079 | B2 * | 3/2012 | Mather et al. | 345/32 |
| 8,264,500 | B2 * | 9/2012 | Wilensky | 345/592 |
| 2001/0006414 | A1 | 7/2001 | Gelbart | |
| 2001/0043739 | A1 * | 11/2001 | Oshino et al. | 382/154 |
| 2001/0052935 | A1 | 12/2001 | Yano | |
| 2002/0069779 | A1 | 6/2002 | Baba et al. | |
| 2002/0075566 | A1 | 6/2002 | Tutt et al. | |
| 2002/0191841 | A1 | 12/2002 | Harman | |
| 2003/0007204 | A1 * | 1/2003 | Ashizaki et al. | 359/23 |
| 2003/0082463 | A1 | 5/2003 | Laidig et al. | |
| 2003/0093600 | A1 * | 5/2003 | Perala et al. | 710/72 |
| 2003/0112523 | A1 | 6/2003 | Daniell | |
| 2003/0223499 | A1 | 12/2003 | Routhier et al. | |
| 2003/0234980 | A1 * | 12/2003 | Montgomery et al. | 359/462 |
| 2004/0012671 | A1 | 1/2004 | Jones et al. | |
| 2004/0024287 | A1 | 2/2004 | Patton et al. | |
| 2004/0125106 | A1 | 7/2004 | Chen | |
| 2004/0239758 | A1 * | 12/2004 | Schwerdtner | 348/51 |
| 2004/0252374 | A1 * | 12/2004 | Saishu et al. | 359/462 |
| 2005/0030409 | A1 | 2/2005 | Matherson et al. | |
| 2005/0069223 | A1 | 3/2005 | Tanimura et al. | |
| 2005/0073530 | A1 | 4/2005 | Kapur et al. | |
| 2005/0083516 | A1 | 4/2005 | Baker | |
| 2005/0111100 | A1 * | 5/2005 | Mather et al. | 359/464 |
| 2005/0124851 | A1 | 6/2005 | Patton et al. | |
| 2005/0138569 | A1 | 6/2005 | Baxter et al. | |
| 2005/0190258 | A1 | 9/2005 | Siegel et al. | |
| 2005/0218807 | A1 * | 10/2005 | Min | 313/582 |
| 2005/0243350 | A1 | 11/2005 | Aoyama | |
| 2006/0012878 | A1 * | 1/2006 | Lipton et al. | 359/463 |
| 2006/0018526 | A1 | 1/2006 | Avinash | |
| 2006/0038705 | A1 * | 2/2006 | Brady et al. | 341/13 |
| 2006/0042322 | A1 * | 3/2006 | Mendoza et al. | 65/386 |
| 2006/0050382 | A1 | 3/2006 | Jahrmarkt et al. | |
| 2006/0092505 | A1 | 5/2006 | Abnet et al. | |
| 2006/0103670 | A1 * | 5/2006 | Matsumoto | 345/626 |
| 2006/0118036 | A1 * | 6/2006 | Takeda et al. | 117/89 |
| 2006/0139447 | A1 | 6/2006 | Unkrich | |
| 2006/0170764 | A1 * | 8/2006 | Hentschke | 348/42 |
| 2006/0291052 | A1 | 12/2006 | Lipton et al. | |
| 2007/0011924 | A1 * | 1/2007 | Dana | 40/454 |
| 2007/0097502 | A1 | 5/2007 | Lipton et al. | |
| 2007/0117030 | A1 | 5/2007 | Laidig et al. | |
| 2007/0121076 | A1 | 5/2007 | Klippstein et al. | |
| 2007/0171037 | A1 * | 7/2007 | Schofield et al. | 340/438 |
| 2007/0196028 | A1 | 8/2007 | Kokemohr et al. | |
| 2007/0247645 | A1 | 10/2007 | Touchard et al. | |
| 2008/0002255 | A1 * | 1/2008 | Tavor et al. | 359/464 |
| 2008/0012850 | A1 | 1/2008 | Keating, III | |
| 2008/0080773 | A1 * | 4/2008 | Brady et al. | 382/210 |
| 2008/0117233 | A1 | 5/2008 | Mather et al. | |
| 2009/0005961 | A1 * | 1/2009 | Grabowski et al. | 701/200 |
| 2011/0311134 | A1 * | 12/2011 | Wilensky | 382/164 |
| 2014/0002351 | A1 * | 1/2014 | Nakayama | 345/156 |

FOREIGN PATENT DOCUMENTS

| | | |
|---|---|---|
| EP | 1324587 | 7/2003 |
| JP | 11-149134 | 6/1999 |
| JP | 2001-186549 | 7/2001 |
| JP | 2006-162666 | 6/2006 |
| WO | WO 97/47942 | 12/1997 |
| WO | WO 2004/036286 | 4/2004 |
| WO | WO 2005/091050 | 9/2005 |
| WO | WO 2008/087632 | 7/2008 |
| WO | WO 2008/102366 | 8/2008 |
| WO | WO 2009/013744 | 1/2009 |

OTHER PUBLICATIONS

Response Dated Oct. 13, 2010 to Communication Pursuant to Article 94(3) EPC of Jun. 15, 2010 From the European Patent Office Re. Application No. 087702641.5.
Translation of Notice of Reason for Rejection Dated Feb. 7, 2012 From the Japanese Patent Office Re. Application No. 2009-546064.
International Preliminary Report on Patentability Dated Sep. 3, 2009 From the International Bureau of WIPO Re.: Application No. PCT/IL2008/000237.
International Preliminary Report on Patentability Dated Feb. 4, 2010 From the International Bureau of WIPO Re.: Application No. PCT/IL2008/001017.
International Preliminary Report on Patentability Dated Jul. 30, 2009 From the International Bureau of WIPO Re.: Application No. PCT/IL2008/000060.
International Search Report Dated Nov. 12, 2008 From the International Searching Authority Re.: Application No. PCT/IL2008/000060.
International Search Report Dated Nov. 12, 2008 From the International Searching Authority Re.: Application No. PCT/IL2008/000237.
International Search Report Dated Apr. 20, 2009 From the International Searching Authority Re.: Application No. PCT/IL2008/001017.
Written Opinion Dated Nov. 12, 2008 From the International Searching Authority Re.: Application No. PCT/IL2008/000060.
Written Opinion Dated Nov. 12, 2008 From the International Searching Authority Re.: Application No. PCT/IL2008/000237.
Written Opinion Dated Apr. 20, 2009 From the International Searching Authority Re.: Application No. PCT/IL2008/001017.
Communication Pursuant to Article 94(3) EPC Dated Jun. 6, 2012 From the European Patent Office Re. Application No. 087702641.5.
Communication Pursuant to Article 94(3) EPC Dated Jun. 9, 2010 From the European Patent Office Re. Application No. 08710237.2.
Communication Pursuant to Article 94(3) EPC Dated Jun. 15, 2010 From the European Patent Office Re. Application No. 087702641.5.
Official Action Dated Jul. 6, 2012 From the US Patent and Trademark Office Re. U.S. Appl. No. 12/448,894.
Response Dated Oct. 5, 2010 to Communication Pursuant to Article 94(3) EPC of Jun. 9, 2010 From the European Patent Office Re. Application No. 08710237.2.
Translation of Notice of Reason for Rejection Dated Sep. 28, 2012 From the Japanese Patent Office Re. Application No. 2009-550774.
Official Action Dated Sep. 11, 2012 From the US Patent and Trademark Office Re. U.S. Appl. No. 12/528,328.
Notice of Allowance Dated Jun. 7, 2013 From the US Patent and Trademark Office Re. U.S. Appl. No. 12/528,328.
Communication Pursuant to Article 94(3) EPC Dated Feb. 25, 2014 From the European Patent Office Re. Application No. 08710237.2.

* cited by examiner

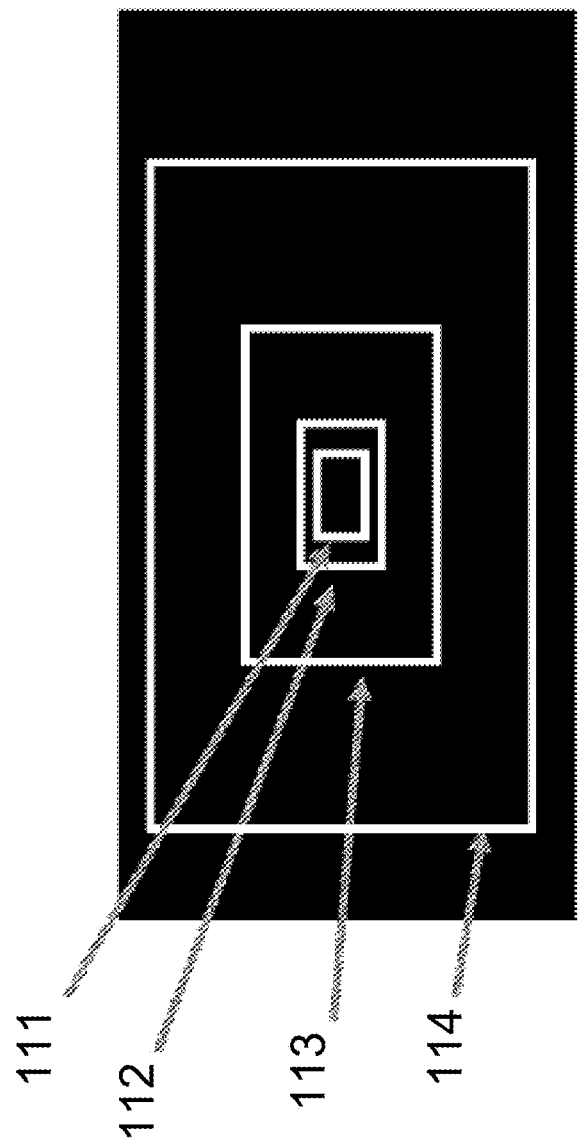

MULTI VIEW DISPLAYS AND METHODS FOR PRODUCING THE SAME

RELATED APPLICATIONS

This Application is a National Phase of PCT Patent Application No. PCT/IL2008/001017 having International filing date of Jul. 23, 2008, which claims the benefit of U.S. Provisional Patent Application Nos. 60/979,853 filed on Oct. 14, 2007 and 60/951,242 filed on Jul. 23, 2007. The contents of the above Applications are all incorporated herein by reference.

FIELD AND BACKGROUND OF THE INVENTION

The present invention, in some embodiments thereof, relates to a surface and a method for displaying images and, more particularly, but not exclusively, to a surface and a method for displaying interlaced images.

Conventional print advertising, decorating, branding, and packaging is usually accomplished by printing stationary non-moveable information and pictures on two or three dimensional objects. One of the primary purposes of the printing is to attract the attention of observers. In an effort to attract the customer's attention, various types of displays have been developed. Examples for conventional displays are illuminated signs, including neon signs, billboard illuminated with flood lights and spot lights, marquees with moving messages, blinking lights, and the like. Other displays such as angle dependent displays have also been developed. Examples for angle dependent displays are directional display sheets, such as lenticular lens and barrier sheets. From the observer point of view, an angle dependent display displays an image that changes when viewed from different angles. Integral viewing sheets include an interlaced image that combines strips of at least two images and an optical barrier, such as an array of lenticular lenses and a parallax barrier. The optical barrier allows the creation of a dynamic image, for example by offsetting the various layers of the interlaced images at different increments in order to give a motion effect and/or a three dimension (3D) effect to the observer. The most common method of printing lenticular images, which accounts for the vast majority of lenticular images in the world today, is lithographic printing of the composite interlaced image directly onto flat surface of the lenticular lens sheet. From the observer point of view a conventional display displays the same dynamic image regardless to the distance thereto and an angle dependent display, when designed to display distinctly different images, displays a distinct image only when the observer is in a limited domain of viewing distance therefrom.

For example, U.S. Pat. No. 5,494,445, filed on Oct. 31, 1994, depicts an efficient economical process is provided to produce an intricate impressive display with outstanding marketing and advertising appeal. In the process, multiple images are formed, such as on a central processing unit, the images are masked and striped, and portions thereof are superimposed. The superimposed masked images can be printed on an underlying back rearward web. Transparent rods, a plate lens, lenticular lens, a cluster of anomorphic lenses, or a grid, can be placed front of the back web to provide a special display which has the illusion of animation as the angle of sight changes.

It should be noted that using a parallax barrier for creating integral viewing sheets results a great deal of light which is absorbed and/or diffused by it. Thus, such integral viewing sheets may suffer from a decreased brightness problem. Solutions for increasing the brightness of such integral viewing sheets have been developed. For example, a backlight element, which is attached to the back of an integral viewing sheet, is designed function as an alternative light source that replaces the light that is absorbed and/or diffused by the parallax barrier. In another solution, the absorbed light is reuse. The light absorbed or diffused by barrier is guided back to a reflected layer to create backlight that raises the illumination in approximately 114.47%, see Chien-Yue Chen et. al., a novel high brightness parallax barrier stereoscopy technology using a reflective crown grating, National Yunlin University of Science and Technology, Taiwan, Wiley Periodicals, Inc. Microwave Opt Technol Lett 50: 1610-1616, 2008, which the content thereof is incorporated herein by reference.

SUMMARY OF THE INVENTION

According to some embodiments of the present invention there is provided a method for creating a distance dependent display. The method comprises providing an image separating mask having a plurality precision slits arranged in a pattern, generating an interlaced image from a plurality of images according to the pattern, and combining the interlaced image and the image separating mask to allow an observer to view substantially separately each the image from a respective of a plurality of different distances from the image separating mask.

Optionally, the pattern is irregular.

More optionally, the irregular pattern is selected from a group consisting of: an asymmetric pattern of opaque and transparent sub-areas, a pattern having opaque segments with variable widths, a pattern having transparent segments with variable widths, and a pattern in which the various segments having variable opacities.

Optionally, the plurality of precision slits comprises a member selected from the group consisting of linear slits, curved slits, annular slits, twisted slits, spiraling slits and/or kinked slits.

Optionally, the combining comprises attaching the interlaced image to a side of a transparent surface and the image separating mask to an opposing side of the transparent surface.

Optionally, the providing comprises arranging the plurality of precision slits according to a binary image.

Optionally, each the image having at least one of a different hue and a different color, wherein the hue perceived from each the distance is different.

According to some embodiments of the present invention there is provided a distance dependent display that comprises an image separating mask having a plurality of precision slits arranged in a pattern and an interlaced image from a plurality of images, each the image is interlaced to match the pattern. The interlaced image and the plurality of precision slits are aligned to allow an observer to view substantially separately each the image from a respective of a plurality of different distances from the image separating mask.

Optionally, the distance dependent display comprises a transparent surface, the transparent surface the interlaced image and the image separating mask is attached to opposite sides of the transparent surface.

Optionally, the distance dependent display comprises an attachment element for attaching the distance dependent display to a window.

Optionally, the image separating mask comprises a member of a group consisting of: a parallax barrier, a grating, and an optical barrier.

Optionally, the image separating mask is an optical barrier, the plurality of precision slits comprising a member of a group consisting of lenticular lenses, diffractive elements, and lenses for integral photography.

According to some embodiments of the present invention there is provided a method for creating an integral viewing sheet that comprises providing an image separating mask having a plurality of precision slits arranged in a predefined pattern that applies an estimated blur, interlacing a plurality of images to form an interlaced image according to the predefined pattern, at least one of the interlaced image and plurality of images are processed according to the estimated blur, and creating an integral viewing sheet by fixating the image separating mask in parallel to the interlaced image.

Optionally, the predefined pattern is irregular.

Optionally, the irregular pattern is selected from a group consisting of: an asymmetric pattern of opaque and transparent sub-areas, a pattern having opaque segments with variable widths, a pattern having transparent segments with variable widths, and a pattern in which the various segments having variable opacities.

Optionally, the image separating mask has a transparent-opaque ratio of at least 1:1.

Optionally, the interlaced image comprises a plurality of strips, at least one of the plurality of precision slits is wider than one of the strips.

According to some embodiments of the present invention there is provided an article for viewing images of an interlaced image. The article comprises an image separating mask having a plurality of precision slits arranged in an irregular pattern and an interlaced image from a plurality of images, each the image is interlaced to match the irregular pattern. The interlaced image and the plurality of precision slits are combined to allow an observer to view substantially separately each the image from a respective of a plurality of various viewing positions from the image separating mask.

Optionally, irregular pattern is selected from a group consisting of: an asymmetric pattern of opaque and transparent sub-areas, a pattern having opaque segments with variable widths, a pattern having transparent segments with variable widths, and a pattern in which the various segments having variable opacities.

Optionally, the article further comprises a backlight element for illuminating interlaced image via the image separating mask, the interlaced image is positioned between the observer and the image separating mask.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 3A-3C are schematic illustration of patterns of precision slits of an image separating mask, such as a parallax barrier of a distance dependent display, according to some embodiments of the present invention;

DESCRIPTION OF SPECIFIC EMBODIMENTS OF THE INVENTION

Figure 1:
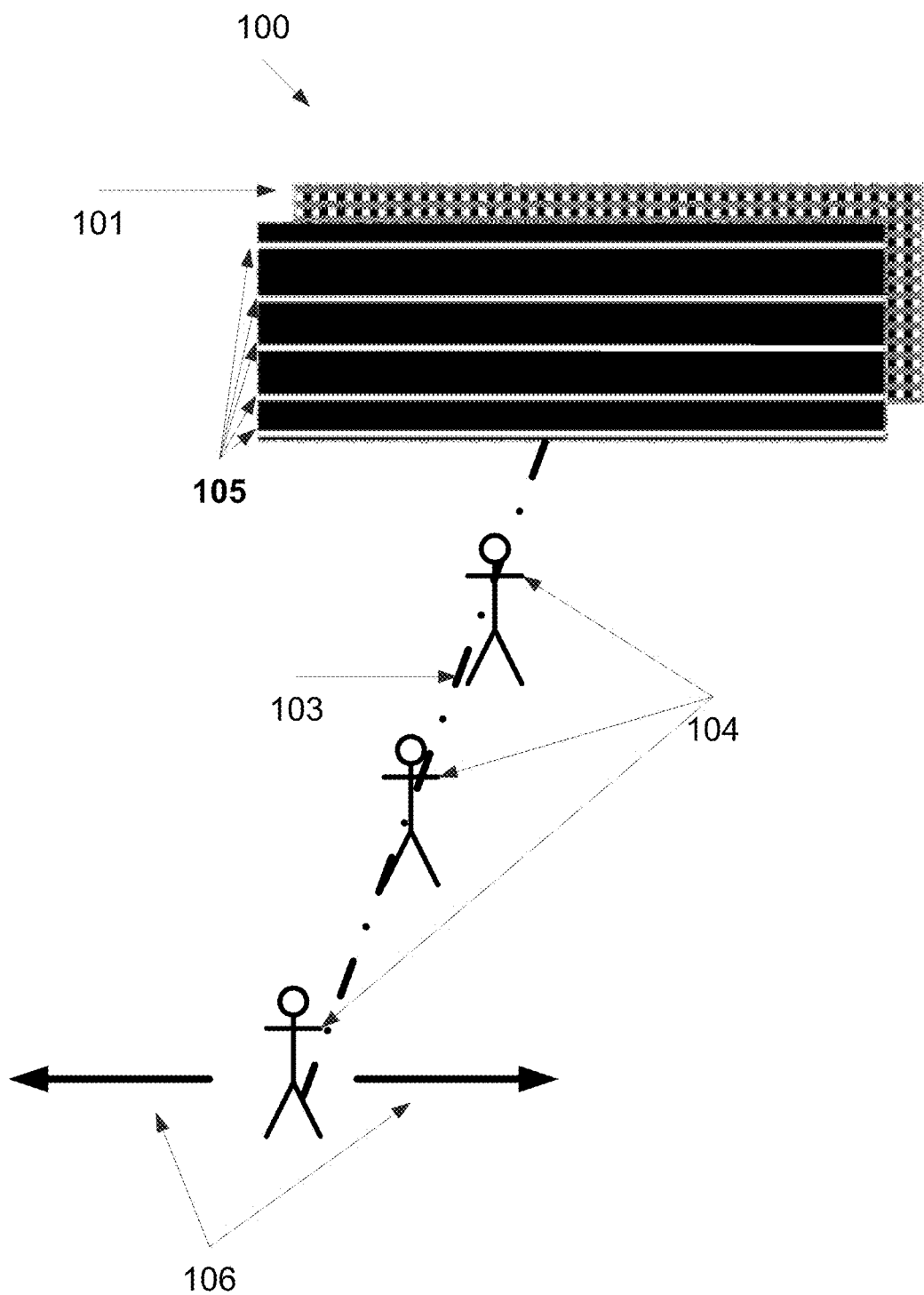
FIG. 1 is a schematic illustration of a distance dependent display, a virtual perpendicular to the face of the distance dependent display and a number of exemplary observers, according to some embodiments of the present invention.

The present invention, in some embodiments thereof, relates to a surface and a method for displaying images and, more particularly, but not exclusively, to a surface and a method for displaying interlaced images.

According to some embodiments of the present invention, there is provided a distance dependent display and a method for generating the same. The distance dependent display allows an observer that advances toward it or draws away therefrom to view substantially separately a set of images which have been combined to form an interlaced image. In each one of the distances the observer may be at a substantially equal angle in relation to the face of the parallax barrier. Thus, the observer does not have to change her angular position in relation to the distance dependent display in order to experience a multi view effect. Such a distance dependent display may be used for displaying a set of images for advertisement, and/or as a shader, for example as a removable window shader and a fixed or a removable car window shader, a signpost, and/or a traffic sign.

In some embodiments of the present invention, an article for viewing images of an interlaced image, such as a distance dependent display, is provided. The article comprises an image separating mask, such as a parallax barrier, having precision slits arranged in an irregular pattern and a plurality of images which have been interlaced to form an interlaced image that matches the irregular pattern. The interlaced image and the precision slits are combined to allow an observer to view substantially separately each one of the images from different viewing positions, such as different distances and/or angles from the image separating mask.

According to some embodiments of the present invention, there is provided a method for creating an integral viewing sheet which is based on a barrier with relatively high transparent-opaque ratio. Such a barrier allows the integral viewing sheet to display a relatively bright multi view image without the illumination of a backlight element and/or without blurring the image to an extent exceeds the blurring which is applied by a barrier with lower transparent-opaque ratio.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a schematic illustration of a distance dependent display 100, a virtual perpendicular 103 to the face of the distance dependent display 100 and a number of exemplary observers 104, which may be the same observer in motion along the virtual perpendicular 103, according to some embodiments of the present invention. The distance dependent display 100 comprises a parallax barrier 102 having precision slits 105 and an interlaced image 101 that is generated from a set of images, optionally as described below in relation to 202.

As used herein as an image separating mask means a parallax barrier, a grating, a lenticular lenses array, a diffractive a multi image display screen, an array of lenses for integral photography (IP), for example as described in U.S. Pat. No. 5,800,907, filed on May 23, 1996 that is incorporated herein by reference and any optical element that is designed for directing light from image strips of image A of the interlaced image differently from light from image strips of image B of the interlaced image so as to create different parallel viewing windows at different viewing distances. As used herein precision slits means slits or any other optical sub elements, which are designed for directing light from strips of different images of the interlaced image in a different manner.

Figure 2:
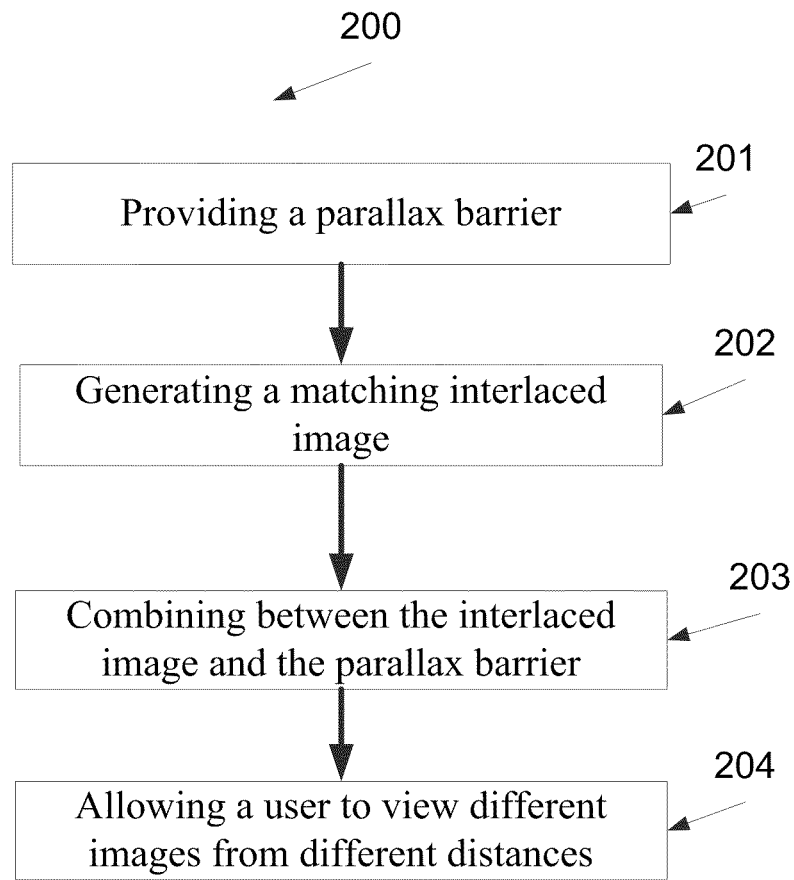
FIG. 2 is a flowchart of a method for generating a distance dependent display, for example as depicted in FIG. 1, according to some embodiments of the present invention.

Reference is also made to FIG. 2, which is a flowchart 200 of a method for generating a distance dependent display, for example as depicted in FIG. 1, according to some embodiments of the present invention. First, as shown at 201, the image separating mask 102 is provided. The precision slits 105, which may be linear, curved, annular, twisted, spiraling and/or kinked, are optionally made of a transparent material, such as glass, Biaxial-oriented polyethylene-terephthalate (boPET) polyester film, and/or polycarbonate resin thermoplastic film. The precision slits 105 are formed between opaque strips, such as shown at 106. Optionally, the precision slits 105 are arranged in an irregular pattern of opaque and transparent sub-areas. As used herein, an irregular pattern is an asymmetric pattern of opaque and transparent sub-areas, a pattern in which the widths of opaque segments are not constant, the widths of transparent segments, such as slits, are not constant, a pattern in which the opaque segments have different opacities, a pattern in which the transparent segments have different opacities.

In some embodiments of the present invention, an article for viewing images of an interlaced image, such as a distance dependent display, with such an image separating mask is provided. The article comprises an image separating mask having precision slits arranged in the aforementioned irregular pattern and an interlaced image which is based on a plurality of images which have been interlaced to match the irregular pattern. The interlaced image and the precision slits are combined to allow an observer to view substantially separately each one of the images from a respective of a plurality of viewing positions, such as different distances and/or angles from said image separating mask.

The irregular pattern may be defined to allow an observer to view different images from different distances along the perpendicular. In should be noted that the perpendicular may be positioned in front of segment of the face of the image separating mask 102. Optionally, the slits are defined to allow a user in a distance A from the face of the image separating mask 102 to move in parallel to the image separating mask 102, for example as shown at 106, without experiencing a substantial change or blur in the viewed image that is associated with distance A.

The image separating mask 102 restricts the visibility of pixels of the interlaced image 101 at different viewing distances in front of it. Horizontal and/or vertical pitches of the precision slits 105 are designed to allow an observer in one of a number of parallel viewing windows, as shown at 107, to view strips of only one of the images which have been interlaced to create the interlaced image 101. For example, the image separating mask 102 may restrict the visibility of pixels of an interlaced image 101 that is based on strips from images A, B, and C in a manner that an observer in a distance of approximately of 1 meter therefrom sees strips of image A, an observer in a distance of 3.16 meters therefrom sees strips of image B, and an observer in a distance of approximately of 10 meter therefrom sees strips of image C.

Figure 3A:
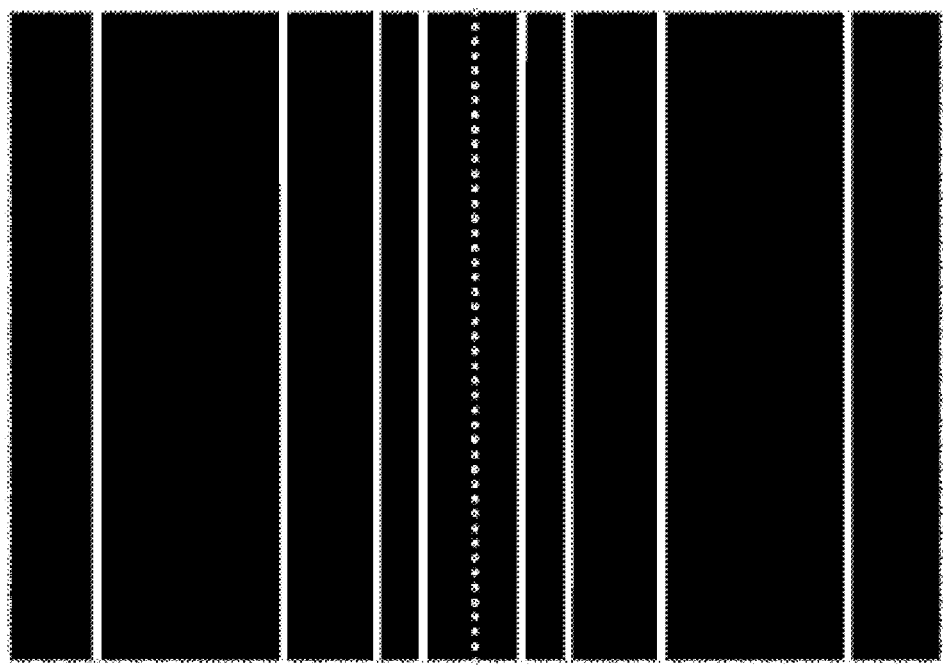
Figure 3B:
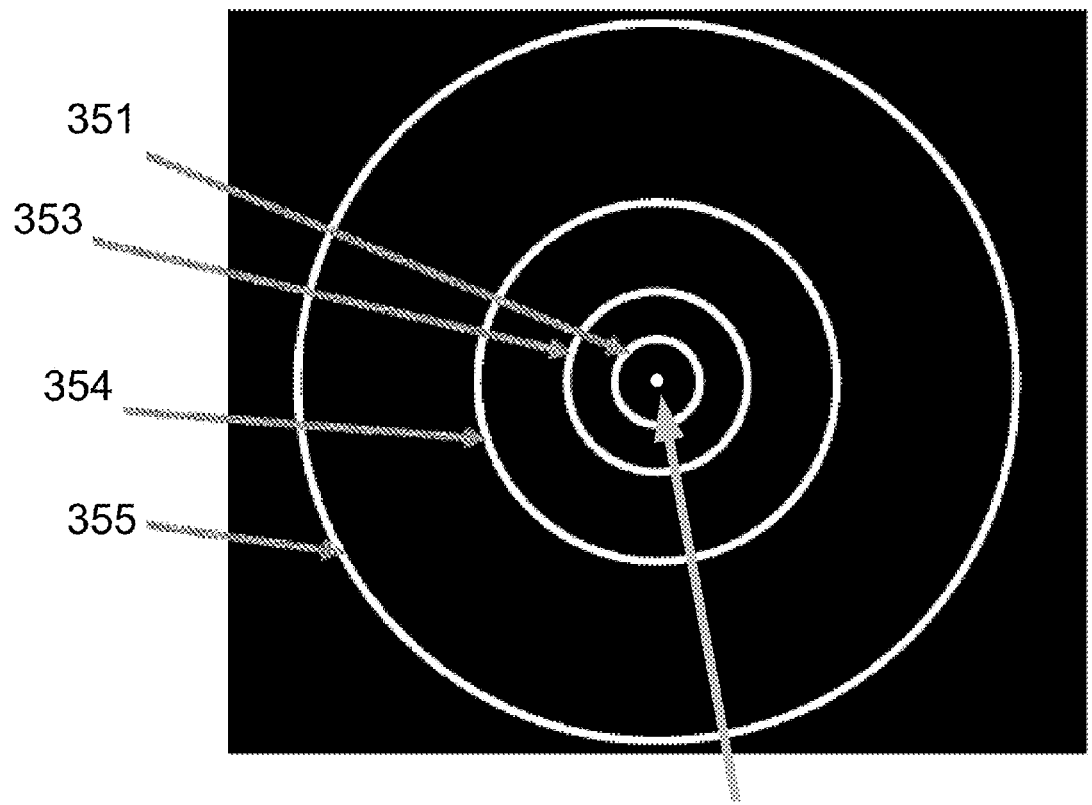

The image separating mask 102 is used for associating images of the set which has been used for creating the interlaced image and viewing distances in front of it. image separating mask 102 As described above, the precision slits 105 may be linear, for example as shown at FIG. 3A, circular, for example as shown at FIG. 3B, and/or rectangular, for example as shown at FIG. 3C.

It should be noted that when the pattern is linear, as shown at FIG. 3A, the numerical accuracy increases due to the simplicity of the pattern. In addition such a pattern does not apply artifacts which are an outcome of wrong assumption about the eye level of the observer in case of vertical slits or the horizontal location of the viewer in case of horizontal slits. A square slit pattern, as shown at FIG. 3B improves the motion parallax effect while maintaining a relatively high numerical accuracy.

Figure 4A:
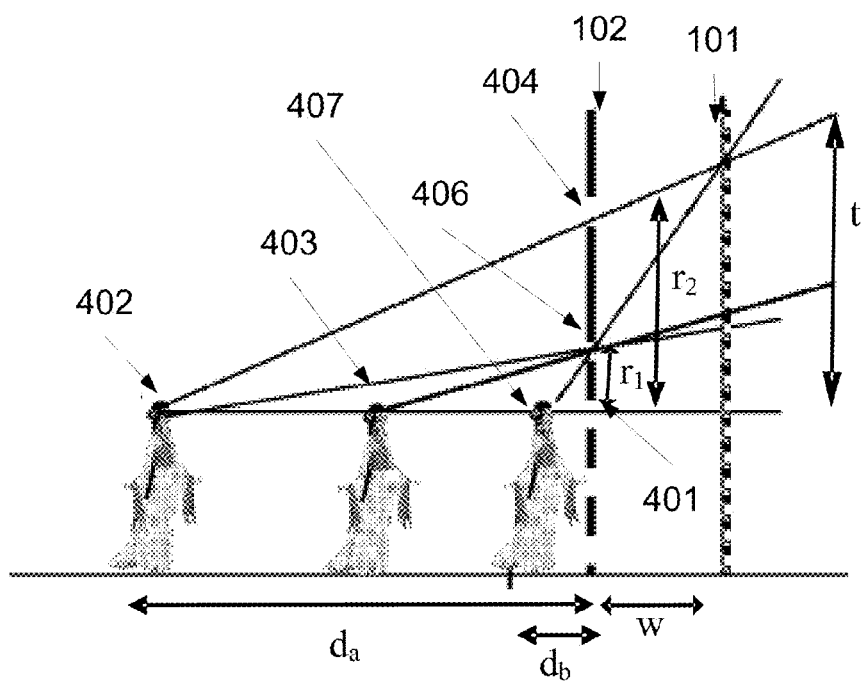
FIG. 4A is a lateral schematic illustration of an observer that advances toward a distance dependent display, according to some embodiments of the present invention.

For example, when the image separating mask 102 includes precision slits which are curved according to a circular pattern, each precision slit is adjusted to allow an observer at a distance A from the image separating mask 102 to view an associated strip that has been trimmed from an image A and added to the interlaced image 101. In addition, the same precision slit is adjusted to allow an observer at a distance B from the image separating mask 102 to view an associated strip that has been trimmed from an image B and added to the interlaced image 101. In such a manner, the observer image separating mask 102 sees different images in different distances from the image separating mask 102. For example, as depicted in FIG. 4A, while observer 402 in distance $D_o$ from the face of the image separating mask 102 may see strips via slits 401 and 404, observer 403 which is closer to the image separating mask 102 may see strips via slits 401 and 406.

Figure 4B:
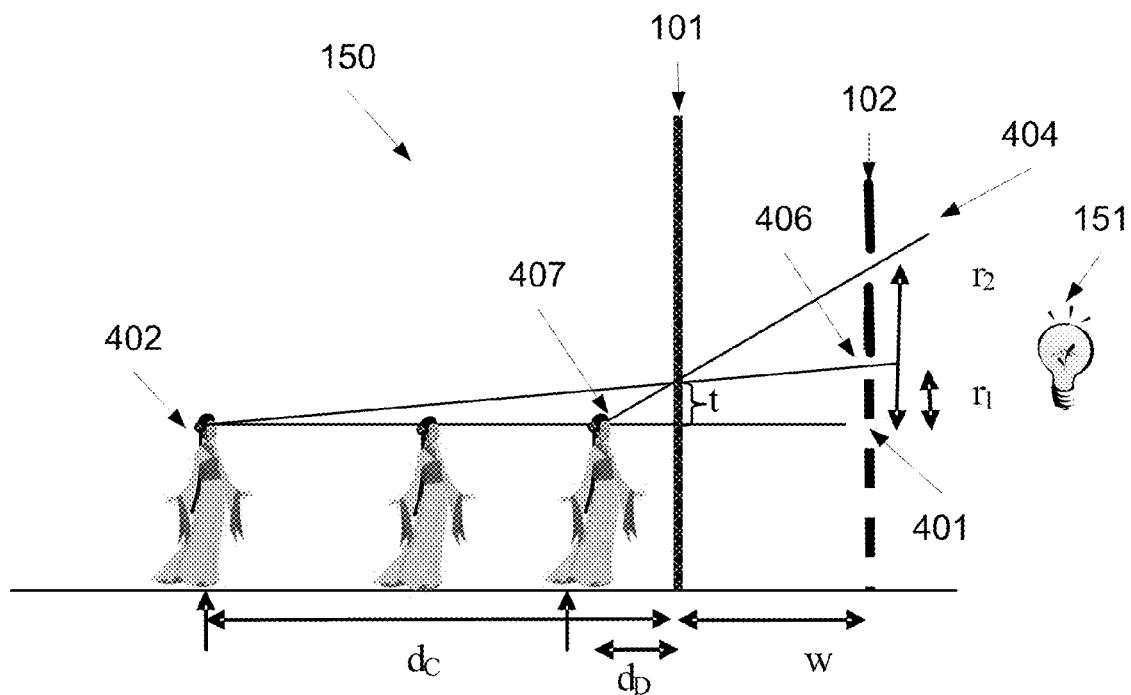
FIG. 4B is a lateral schematic illustration of an observer that advances toward a reversed distance dependent display with a back lit, according to some embodiments of the present invention.

Reference is now also made to FIG. 4B, which is a lateral schematic illustration of an observer that advances toward a reversed distance dependent display 150 with a back lit, according to some embodiments of the present invention. In FIG. 4B, the components of the distance dependent display are reversed. The image separating mask 102 is placed between the interlaced image 101 and a rear light source, such as a uniform flat light source, for example a number of light emitting diodes (LEDs) and/or electric lamps and restricts the visibility of pixels of the interlaced image 101 at different viewing distances in front of it by blocking the emitted light from traveling in certain trajectories.

The precision slits may be curved in a plurality of patterns that satisfy predefined conditions, such as slits with respective size, respective distance from a reference point and/or for adjacent slits, and/or respective radii.

Optionally, the one or more predefined conditions include similar shapes and predefined distance ratios from a reference point. In such an embodiment, the slits 105 are shaped similarly, for instance as shown at FIGS. 3A-3C.

Optionally, the one or more predefined conditions include scaling the width of the slits to account for the variable distance between the slits in a manner that assures that the face of the slit has roughly uniform transparent-opaque ratio across different areas in the pattern image. For example, the width of each slit may correspond with a third of the average distance between the slit and neighboring slits.

Optionally, the one or more predefined aspects include equivalent size ratios, for example as shown at FIG. 3C. In such an embodiment, a ratio between the distance of a certain point on a precision slit 111 of an image separating mask, such as a parallax barrier, to a reference point and the distance of a respective point on another precision slit 112 to the reference point is equal to a respective ratio between precision slits 113, 114. The reference point may be an internal point on the image separating mask 102, for example the center thereof, or an external point that is positioned in the space that surrounds the image separating mask 102.

For example, the following equations, with reference to of the image separating mask 102 in FIG. 4A, define the ratio between the gap between the centers of precision slits that allows the observer to see certain strips from a first viewing distance and the gap between centers of precision slits that allows the observer to see the same strips from a second viewing distance:

$$t = r_1 \frac{w + d_D}{d_D}$$

$$t = r_2 \frac{w + d_C}{d_C}$$

$$\Rightarrow \frac{r_2}{r_1} = \frac{d_C}{d_D} \frac{w + d_D}{w + d_C}$$

where w denotes the distance between the image separating mask 102 and the interlaced image 101, $r_2$ denotes the distance between the highest slit that observer 407 sees at distance $d_a$ and the reference point, $r_1$ denotes the distance between the highest slit that observer 407 sees at distance $d_b$ and the reference point, t denotes the distance between strips which are seen by observer 402 and observer 407 at distance $d_a$ and $d_b$.

The same is true for reversed distance dependent display. The following equations, with reference to of the image separating mask 102 in FIG. 4B, define the ratio between the gap between the centers of precision slits that allows the observer to see certain strips from a first viewing distance and the gap between the centers of precision slits that allows the observer to see the same strips from a second viewing distance:

$$t = r_1 / \frac{w + d_D}{d_D}$$

$$t = r_2 / \frac{w + d_C}{d_C}$$

$$\Rightarrow \frac{r_2}{r_1} = \frac{d_D}{d_C} \frac{w + d_C}{w + d_D}$$

where w denotes the distance between the image separating mask 102 and the interlaced image 101, $r_1$ denotes the distance between the highest slit that observer 407 sees at distance $d_c$ and the reference point, $r_2$ denotes the distance between the highest slit that observer 407 sees at distance $d_d$ and the reference point, and t denotes the distance between strips which are seen by observer 402 and observer 407 at distance $d_c$ and $d_d$.

Optionally, if the pattern of the slits is circular, for example as shown at FIG. 3A, each circular slit, as shown also in FIG. 3A, is concentric with the reference point that is positioned as a center on an estimated eye level of a typical person, for example in front of the average human eye level. In such an embodiment, the perpendicular is aligned at the estimated eye level. It should be noted that the perpendicular may or may not intersect the physical face of the display. In such an embodiment, a ratio between the distance of a certain point on precision slit 351 to the reference point, a common circular center 352, and the distance of a respective point on another precision slit 353 to the common circular center 352 is equal to a respective ratio between precision slits 354 and 355.

It should be noted that circular slits exhibit a full motion-parallax effect that emulates a set of images taken by a camera that performs zoom in/out and/or a dolly in/out movements.

Now, as shown at 202, an interlaced image 101 is generated according to the pattern of the precision slits 105. The interlaced image is generated from a set of images, optionally sequential. As described above, number of images corresponds to the number of viewing distances. Each image is trimmed to strips that match the dimensions of respective precision slits. For example, for each circular slit that is depicted in FIG. 3B, a circular strip with respective dimensions is copied or interpolated. The circular strip is copied or interpolated from the respective image of the set of images. The strips are interleaved to form the interlaced image.

Now, as shown at 203, each one of the image strips of the interlaced image 101 is combined and/or aligned with the matching precision slit. As shown at 204, such an alignment allows an observer that moves toward and/or from the face of the image separating mask 102 to view each one of the images in the set of images substantially separately. As depicted in FIG. 1 the interlaced image 101 is aligned in front of the image separating mask 102.

In some embodiments of the present invention, the interlaced image 101 is based on a collection of images of a common scene and/or one or more objects, taken from different viewpoints. In such an embodiment, the distance depended device allows the advancing observer to sequentially view the set of images in a manner that simulates a motion of one or more objects which are depicted in the set of images a flip of one or more objects, and/or a change of point of view (POV) of a scene and/or one or more objects which are depicted in the set of images. Providing such a viewing option to the observer may be referred to herein as the multi-view effect.

It should be noted that in conventional multi-view displays, such as lenticular lenses arrays, and arrays of lenses for IP, the observer has to maintain a relatively fixed distance from a the display in order to experience the multi-view effect that is based on an interleaved image. The observer views the set of different images by tilting and/or laterally moving the multi-view article. If the observer does not maintain a fixed distance, as described above, she experiences viewing a mixture of the plurality of images simultaneously.

Optionally, in order to enhance the multi-view effect, image strips of the interlaced image, or segments thereof, which are positioned in the area adjacent to the reference point, are similar or substantially similar. In such an embodiment, the reference point may be positioned in the estimated eye level of the observer, for example as shown at numeral 401 of FIG. 4A. The gap between the image separating mask 102 and the interlaced image 101, as denoted by W, is adjusted to the align the respective strips of the interlaced image 101 in front of the image separating mask 102 in a manner that is adjusted to the eye level of the observer. Optionally, the image separating mask 102 and/or the interlaced image 101 are designed according to W. In such a manner, the distance dependent display is adjusted to the width of a transparent surface that is positioned between the image separating mask 102 and the interlaced image 101, for example as depicted in FIG. 5A. It should be noted that an observer that advances toward or draws away from the distance dependent display 100 views, all along her travel, the same strip that is positioned at the reference point. Optionally, the images which have been taken to create the interlaced image are taken with a static area that is similar, or substantially similar, in the vicinity of the reference point, in all of them and interlacing is performed in a manner that the static area is aligned in front of the eye level of the observer. In such a manner, the static area does not affect the multi view effect of the distance dependent display.

In an exemplary embodiment of the present invention, the face of an image separating mask 102, such as a parallax barrier, may be represented for each pixel, in C++ as follows:

```
struct InterpolationData
{
    short view1; // view1 index
    short view2; // view2 index
    int pos1; // position in view1
    int pos2; // position in view2
    float weight1;
    unsigned char colorBarrier; };
``` where the weight of view2 is optionally 1−weight1 and colorBarrier denotes a barrier color in the corresponding pixel. Each pixel of the respective interlaced image is created as a linear combination of pixels of indexed view1 and indexed view2.

In addition, the parameters of the job are kept in variable m_p that is of a type struct Params:

```
struct Params
{
    int m__inputPixLength;     // The size of the input view.
    int m__outputPixLength;    // The size of the output view.
    int m__numViews;           // number of views
    int m__numChannels;        // number of channels per pixel
                               (including alpha)
    float m__dist1mm;          // distance in which the observer sees the
                               first view
    float m__dist2mm;          // distance in which the observer sees again
                               //the first view.
    float m__printLocationShift;
    float m__thickness;        // transparent surface thickness
    float m__whiteRatio;       // an approximate ratio between the
                               //number of transparent pixels in the
                               //barrier to the total number of pixels
    unsigned char m__white, m__black; // The definition of white/black
    colors
    int m__dpi;                // printing resolution
};
```

Where m_printLocationShift denotes a position from which the image starts at a shift of from a reference point, a point in which the perpendicular intersects the plane containing the interlaced image print. For clarity, dist1 mm and dist2 mm are selected in a manner that when the observer walks from m_dist1 mm to m_dist2 mm, she sees, optionally sequentially, all the views and when she reaches m_dist2 mm where she sees the first view again.

In such an embodiment, mapping between points in the interlaced image and the source images is calculated as follows:

```
void InterlaceCalculatorForward::CalculateInterlaceMap( )
{
    // m__interlaceMap, m__p are members of the class
    InterlaceCalculatorForward
    m__interlaceMap = new
    InterpolationData[m__p.m__outputPixLength];
    const float dist1 = m__p.m__dist1mm;
    const float dist2 = m__p.m__dist2mm;
    const float thickness = m__p.m__thickness;
    double dpi=m__p.m__dpi, sideShift=m__p.m__printLocationShift;
    double ratio = dist2/dist1*(dist1+thickness)/(dist2+thickness);
    // the function 'log' computes the natural logarithm
    // the function 'exp' computes the natural exponent
    double barrierOffset = log(double(m__p.m__numViews));
    double interlaceOffset = barrierOffset + log(dist2+thickness) −
    log(dist2);
    double minI = exp(interlaceOffset);
    double logViewsPerLens=log(ratio);
    float viewPosFactor =
float(m__p.m__inputPixLength)/float(m__p.m__outputPixLength);
    long maxPosIn = m__p.m__inputPixLength−1;
    float imCenter = float(m__p.m__outputPixLength)/2;
    for (int i = 0 ; i < m__p.m__outputPixLength ; ++i)
```

-continued

```
{         // fabs computes the absolute value
    double posFromCenter = fabs(i+dpi*sideShift−imCenter);
    if (posFromCenter <= minI)
        continue;
    InterpolationData& iData = m_interlaceMap[i];
    // a position measured in lenticules
    double posBarrier = (log(posFromCenter)−barrierOffset);
    posBarrier/=logViewsPerLens;
    double posBarrierD = posBarrier−(int)HeFloor(posBarrier);
    iData.colorBarrier = (posBarrierD > 1 − m_p.m_whiteRatio)?
m_p.m_white : m_p.m_black;
    // a position measured in lenticules
    double pos = (log(posFromCenter)−interlaceOffset)/
    logViewsPerLens;
    double lentPartitionPos =
        (exp(pos−HeFloor(pos))−1)/
(exp(HeCeil(pos)−HeFloor(pos))−1) * m_p.m_numViews;
    int leftViewIndex = (int)HeFloor(lentPartitionPos);
    // HeFloor(x) takes the maximal integer smaller than x
    int rightViewIndex = (int)HeCeil(lentPartitionPos);
    //HeCeil(x) takes the minimal integer larger than x
    iData.view1 = leftViewIndex;
    iData.view2 = modulu(rightViewIndex,m_p.m_numViews);
    // view2 is 0 if it equals m_p.m_numViews.
    float exactPos = viewPosFactor*i;
    iData.pos1 = iData.pos2 =
    HeMin((int)HeRound(exactPos),maxPosIn);
    //HeMin(x,y) takes the minimal number between x,y
    //HeRound(x) returns the rounding of x to the closest integer
    iData.weight1 = (HeCeil(lentPartitionPos) −
    lentPartitionPos) > .5;
    // Nearest neighbor interpolation
}
}
```

In some embodiments of the present invention, the precision slits are arranged and/or shaped to form various patterns without a defined geometric shape. These patterns may create ornamental patterns that change according to the user's position.

Optionally the distance dependent display 100 is used for displaying an image with static and dynamic layers. In such an embodiment, the slits of the image separating mask 102 form an ornamental pattern. The image separating mask 102 comprises transparent pixels, for example the aforementioned precision slits, and opaque pixels, for example the barrier segments thereof. In such an embodiment, the transparent and opaque pixels may be arranged to form a binary image of any scene or object. The static layer comprises the opaque pixels and the dynamic layer comprises the transparent pixels. One way to create such binary image patterns is reproducing a continuous-tone image as a series of dots in a process which may be referred to as half toning. In such an embodiment, the black dots are the opaque pixels and the white dots are the transparent pixels or vice versa.

Optionally, each one of the images which are combined to form the interlaced image, as described above, is in a different color or hue. In such an embodiment, the observer that moves forward and/or backward in relation to the distance dependent display experiences a change in the color and/or the hue of the dynamic layer. In such a manner, the image of the distance dependent display may be defined by the image separating mask and the interlaced image may be used for creating a color and/or hue change effect. For example, the transparent and opaque pixels may be arranged to form an image of a stop sign and the interlaced image may be combined of images in different hues of red. In such a manner, the distance dependent display allows the observer to view each one of the hues from different viewing points along the virtual perpendicular 103.

In one application of this invention, the distance-dependent display is used as a warning sign that emphasizes to the observer that she and/or her vehicle are too close to a related object, such as a wall, a vehicle a face, and the like. In such an embodiment, the observer sees an a distance ok sign from a first distance, a mild warning from a shorter distance, a warning from an even shorter distance and so on and so fourth. Optionally, in order to avoid displaying a certain warning at different distances, the display is designed such that only one approximate distance can show a given view within a confined range of distances. Additionally or alternatively, the warning content is designed to be less visible as far as the observer goes, for example by using a small font for the warning text.

Figure 5B:
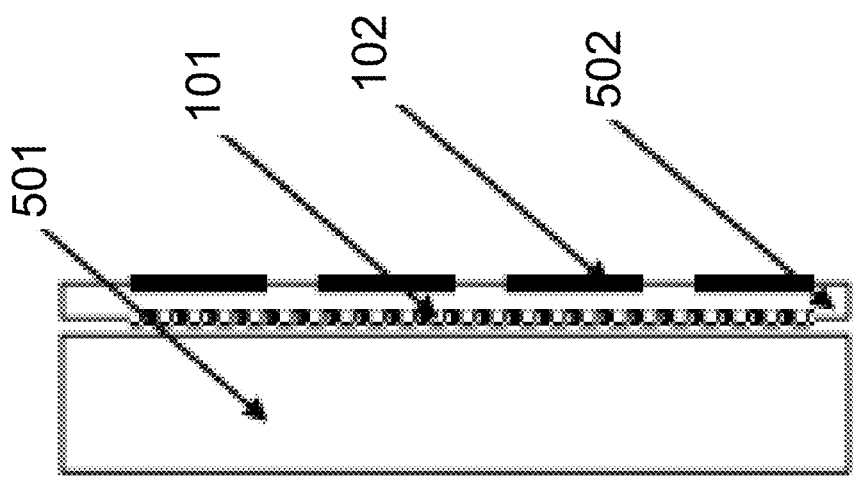
FIG. 5B is a lateral view of a distance dependent display that is attached to a transparent surface, according to some embodiments of the present invention.
Figure 5A:
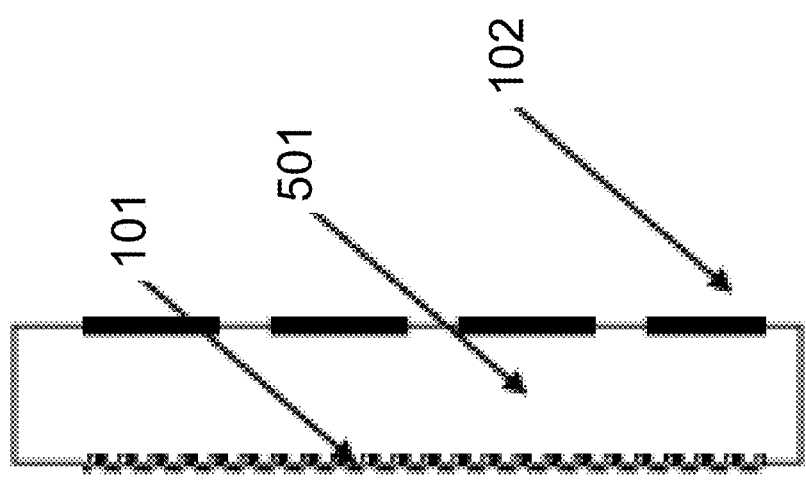
FIG. 5A is a lateral view of a distance dependent display that is assembled on a transparent surface, according to some embodiments of the present invention.

Reference is now also made to FIGS. 5A and 5B, which are schematic lateral illustrations of a distance dependent display 100 that is attached to a transparent surface 501, such as a window, according to some embodiments of the present invention.

In FIG. 5A, the image separating mask 102 is attached to one side of the transparent surface 501 and the interlaced image 101 is attached to the other side of the transparent surface 501. In such an embodiment, the distance dependent display 100 alignment of the interlaced image 101 may be changed according to the width of the transparent surface 501. Optionally, the distance dependent display 100 is provided as a kit that is designed to be attached, as depicted in FIG. 5A, to a transparent surface 501, such as a car window, a window, a glass door, and the like. Optionally, the kit is provided with an interlaced image 101 that is adapted to a window with a certain width.

In FIG. 5B, the distance dependent display 100 includes a transparent media 502. In such an embodiment, one side of the image separating mask 102 is attached to the transparent surface 501 and the opposite side is attached to the transparent media 502 that is attached to the interlaced image 101. Optionally, the distance dependent display 100 is provided as a sticker that may be attached to one side of a transparent surface, such as a car window, a window, a glass door, and the like.

As described above, the distance dependent display 100 includes an image separating mask 102 that may be used for creating a multi view effect. The image separating mask 102, like any other image separating mask that is attached to a certain image, blocks a portion of the illumination that illuminates the interlaced image 101 from the face of the distance dependent display 100. Optionally, the distance dependent display 100 comprises a backlight element in order to increase the brightness of the interlaced image, thereby to achieve a brightness that is comparable with the brightness level of images without an image separating mask.

The distance dependent display 100 which is described above and depicted in FIGS. 5A and 5B may be used as an advertisement, a sign, a fixed or a removable window shader, a fixed or a removable car window shader, a signpost, and a traffic sign.

Figure 6:
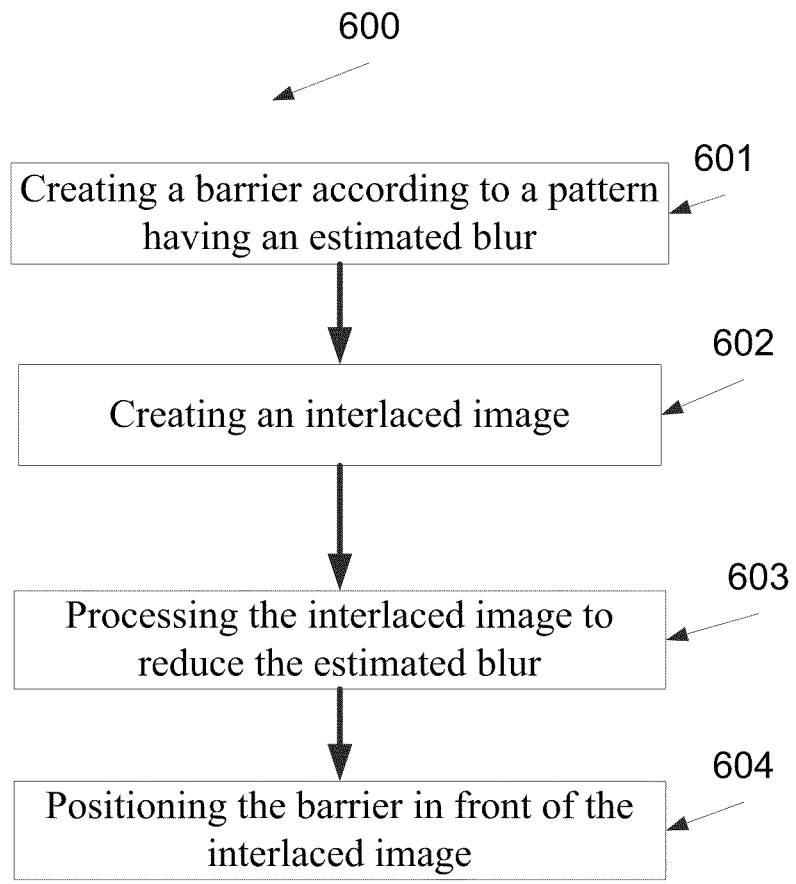
FIG. 6 is a flowchart of a method for designing a parallax barrier, according to some embodiments of the present invention.

Reference is now also made to FIG. 6, which is a flowchart 600 for designing barriers with a high transparent-opaque ratio for integral viewing sheets, such as distance dependent and/or multi-view displays, according to some embodiments of the present invention. For clarity, a transparent-opaque ratio is designed as a ratio between the opaque segments of the image separating mask 102 and the transparent segments thereof. In some embodiments of the present invention, the transparency of the segments affects the transparent-opaque ratio. Transparent segments may not be 100% transparent and opaque segments may not be 100% opaque. Optionally, transparent segments are segments which are at least 50% transparent and opaque segments are segments which are at least 50% opaque. In such an embodiment, transparent segments with high transparency increase the ratio and transparent segments with low transparency decrease it. In such an embodiment the transparent-opaque ratio reflects the transparency of the image separating mask 102 as a whole. As used herein a high transparent-opaque ratio is a transparent-opaque ratio which is greater than 1:1. It should be noted that the method 600 may be used for designing an image separating mask for any multi-view display, such as a stereoscopic display, an auto-stereoscopic display, and a motion emulation display.

A high transparent-opaque ratio reduces or eliminates the need for a relatively strong backlight element or eliminates the need for a backlight at all. An image separating mask with slits, such as a parallax barrier, that has low transparent-opaque ratio, blocks a substantial amount of the light and reduces the visibility of the related multi view element. For example, a front-lit reflective image separating mask is designed to be mostly opaque, for example with approximately or exactly 1/3 transparent-opaque ratio, the image presented by the display may be approximately nine times darker than with a lenticular display. 2/3 of the illumination light is blocked and approximately or exactly 2/3 of the reflections of light that is not blocked, from the interlaced image toward the observer, is also blocked. Thus, increasing the transparent-opaque ratio of the image separating mask has a squared effect on the brightness of the multi-view display. For example, if the image separating mask is designed to be mostly transparent, for example with approximately or exactly 2/3 transparent-opaque ratio, the interlaced image that is attached thereto may be approximately two times brighter without it. In such an embodiment, the image separating mask allows 2/3 of the light that illuminates the multi-view display to cross the barrier toward the interlaced image and approximately or exactly 2/3 of the light that is reflected from the interlaced image to cross the barrier toward the observer.

The method is based, as shown at 601, on creating an image separating mask according to a predefined slit pattern that applies a reducible blur.

As used herein, a reducible blur means a blur with a blurring effect applied by an image separating mask that has been defined to match an interlaced image that has been processed to reduce the blurring effect.

Optionally, the predefined slit pattern has an irregular pattern of opaque and transparent sub-areas, for example as described above.

The blur of the multi-view display depends on the width of the image separating mask slits. Slits, which are wider than the width of a strip of the interlaced image, allow the observer to see more than one strip simultaneously. Such slits may create a display that combines visual data from more than one image. Thus, such a combination may blur the display an observer views in a certain position views segments of one or more unwanted strips of an image that is associated with another position with an image that is associated with the certain position.

Optionally, the predefined slit pattern is designed to allow light to illuminate strips of the interlaced image in a manner that applies reducible blur. An example for such a slit pattern is provided in FIGS. 7 and 8, which are, respectively, a schematic illustration of an exemplary face of an image separating mask 741 and a side view of the image separating mask 741 and a related interlaced image 742, both according to some exemplary embodiments of the present invention. The exemplary face has the following recurrent pattern:

[0 0 0 1 1 1 1 1 1 0 1 1 1 1 1 0 0 0]

where '0' represents an opaque sub-area of the face or of a segment thereof and '1' represents a transparent sub-area of the face or of a segment thereof. Each sub-area has a width 750 that corresponds with the physical size of a strip in the printed interlaced image.

In some embodiments of the present invention, the face of the image separating mask 741 is designed to apply a continuous blur on the printed interlaced image. An exemplary pattern for creating such a continuous blur is

[0 0 0 1 1 1 1 1 0.5 0 0.5 1 1 1 1 0.5 0 0]

where a face that applies such a continuous blur is:

[0 0 0 1 1 1 1 1 0 0 0 1 1 1 1 0 0 0]
[0 0 0 1 1 1 1 1 1 0 1 1 1 1 1 1 0 0]
[0 0 0 1 1 1 1 1 0 0 0 1 1 1 1 0 0 0]
[0 0 0 1 1 1 1 1 1 0 1 1 1 1 1 1 0 0]
[0 0 0 1 1 1 1 1 0 0 0 1 1 1 1 0 0 0]
[0 0 0 1 1 1 1 1 1 0 1 1 1 1 1 1 0 0]

where '0' and '1' are defined as described above. In order to create the continuous blur, the ratio of pixels at a respective pixel location in the consecutive rows is defined according to the continuous blur. For example, a continuous blur that is defined as a 0.5 is replaced with alternating 0 and 1 in a respective ratio of 1:1.

Now, as shown at 602 an interlaced image is created to align with the predefined slit pattern. The interlaced image is created as commonly known to the skilled in the art and therefore need not be described here in detail.

Now, as shown at 603, the interlaced image is processed to reduce and/or to eliminate the reducible blur that is about to be applied by the image separating mask 741. In should be noted that such a processing may be performed before the images are interlaced. In such an embodiment, the set of images is processed before the interlacing, which is shown at 602. The processing before and/or after the interlacing allows the creating of an integral viewing sheet and/or a multi view display with a blur that is similar to the blur of a respective integral viewing sheet and/or a respective multi view display which is based on a standard image separating mask, such as a parallax barrier with a lower transparent-opaque ratio and significantly more illumination, such as illumination of a backlight element. As used herein, illumination means direct illumination such as light that passes via the image separating mask and backlight such as light emitted from a backlight element. The prospective blur reduction, which may be referred to herein as sharpening, is optionally performed by iteratively by convoluting a number of filters.

In some embodiments of the present invention, each channel of a color image is processed independently. Optionally, the color image processed by converting to a color-opponent space, such as a LAB color space, processing the luminance (L) component, for example as described below, and combining the processed L component with the original-opponent dimensions A and B.

The prospective blur reduction may be performed according to Equation 1 below, where the result is the image computed at the last iteration:

$$I^{(0)}b(I)$$

$$I^{(j+1)} = I^{(j)} + s \cdot b(g(I - f(I^{(j)}))) \qquad \text{Equation 1}$$

where I denotes an interlaced image, f denotes a blur that is applied on the integral viewing sheet or the multi-view display by the image separating mask, b denotes is a reference blur, such as a blur created by a standard image separating mask, s denotes a limiting value that is defined to maintain the image within a legal size range, for example within [0.255] for 8-bit images, where a stopping criteria may be defined based on one or more criterions, such as a norm function of I–f (I$^{(j)}$) or the value of s, and g denotes a blur operator.

Optionally, is defined within a proximity to a predefined range for 8-bit images, for example within [–10 . . . 265] and the final values of I$^{(N)}$) are clamped within the predefined range where N denotes a preset number of iterations.

Figure 7:
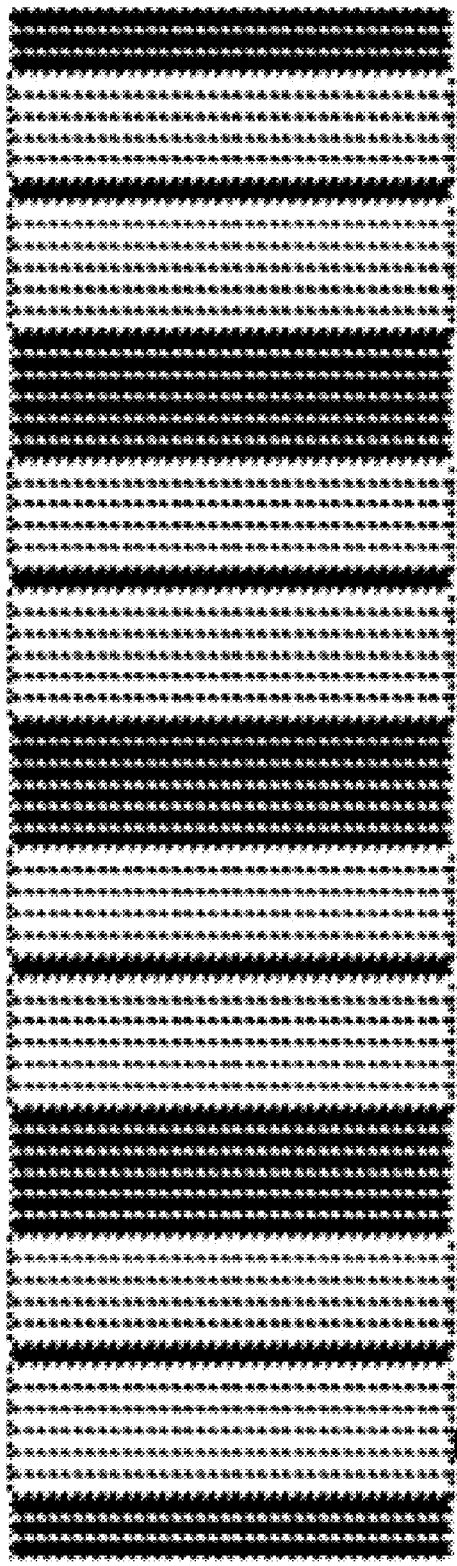
FIGS. 7 and 8 are respectively a schematic illustration of an exemplary face of a parallax barrier and a side view of the parallax barrier and a related interlaced image, both according to some exemplary embodiments of the present invention.
Figure 8:
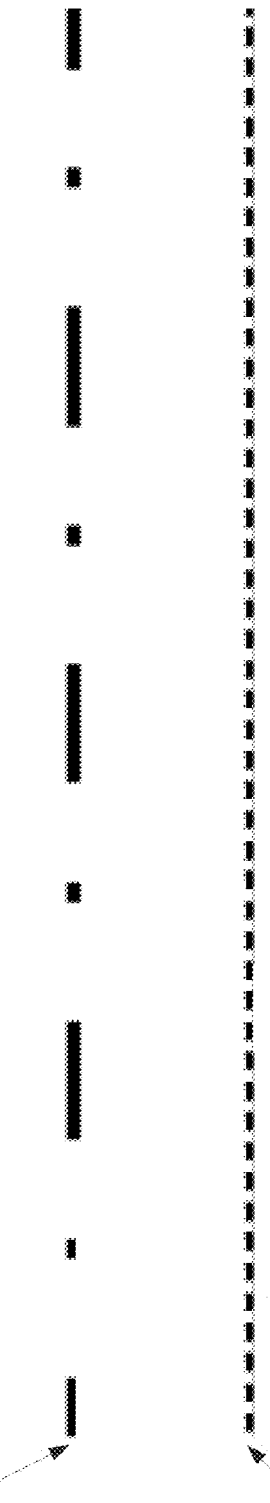

Optionally, f is defined as a filter that is convoluted over the interlaced image. For example, when a parallax which is shown in FIG. 7 is used, f may represent convoluting the following filter:

$\frac{1}{11}$·[0 0 0 1 1 1 1 1 1 0 1 1 1 1 1 0 0 0]

where '0' and '1' are defined as described above and the multiply by $\frac{1}{11}$ is performed for normalizing the outcome.

Optionally, g is defined as a convoluting a filter that is associated with f, in a reversed order, over the interlaced image. For example, in the image separating mask is defined as shown in FIG. 7, g may represent convoluting the following filter:

$\frac{1}{11}$·[0 0 0 1 1 1 1 1 0 1 1 1 1 1 1 0 0 0].

Optionally, b is set to be the blur created by a standard image separating mask, such as a parallax barrier, with transparent-opaque ratio of 1/3. In such an embodiment, b may be represented as a box convolution filter with a width that corresponds to a 1/3 of the width of a basic sub-area. For example, in the image separating mask is defined as shown in FIG. 7, b may represent convoluting the following filter:

$\frac{1}{6}$·[0 0 0 0 0 0 1 1 1 1 1 1 0 0 0 0 0 0]

where the filter includes 6 transparent stripes and 12 opaque stripes and the value $\frac{1}{6}$ is used for gain normalization. It should be noted that b may include other filters, for example those that produce a visual effect that is similar to the visual effect of the image separating mask or those that produce a visual effect different than with an image separating mask such as a Gaussian blur profile.

As described above, the images may be processed before they are interlaced to form the interlaced image 101. In such an embodiment, the processing may be performed as follows:

First, the operator C(h,k) is defined where k denotes the number of images and h denotes a vector h of a length N. The operator returns a vector of length k that describes a sum of sets of elements in f of length N/k. For example, if h=$\frac{1}{11}$·[0 0 0 1 1 1 1 1 1 0 1 1 1 1 1 0 0 0], N=18, and k=3, then C(h,k)=[$\frac{3}{11}$ $\frac{5}{11}$ $\frac{3}{11}$].

Then, a mixing matrix $A_{K\cdot K}$ is defined. Given b and f as defined above, $A_{K\times K}$=$A_b$·$A_f$ where $A_f$ is a pseudo-inverse of a first Toeplitz matrix that is defined to implement a cyclic convolution with the vector C(f,k) and $A_b$ is a second Toeplitz matrix that is defined to implement a cyclic convolution with the vector C(b,k).

Now, each pixel location (x,y) of the k source images is processed separately according the mixing matrix. Given (x,y), and $\vec{v}$ defined as the k×1 vector of pixels from each of the original k source images on location (x,y), the processed images in locations (x,y) are computed as ordered in the variable vectors $\vec{s}$, a k×1 vector, computed according to the equation:

$$A\vec{s}=\vec{v};$$

In case $\vec{s}$ has values out of the range of possible values, then in one implementation the values of $\vec{s}$ are clipped to the possible range. Alternatively, the clipping is performed after the interlacing the processed images.

In general, a Toeplitz matrix G, which is defined to implement a cyclic convolution with a filter g, is defined as follows:

$$G_{k\times k}(i,j)=g((i+j-2)\bmod k)$$

where k denotes the length of g and 0<, j<=k and assuming the filter g is indexed symmetrically around the center in a manner that g(0) is the center of the filter.

Now, as shown at 604, an integral viewing sheet and/or a multi view element are created, for example by fixating the image separating mask in front of the processed interlaced image. As the processing shown at 603 has adjusted the interlaced image to reduce or to eliminate the reducible blur that is applied by the image separating mask, the integral viewing sheet and/or the multi view element has relatively low blurring. As the image separating mask has relatively high transparent-opaque ratio, the brightness level of the integral viewing sheet and/or the multi view element is also relatively high.

It is expected that during the life of a patent maturing from this application many relevant apparatuses and methods will be developed and the scope of the term an image separating mask is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are for brevity, described in the context of a single embodiment, may also be provided substantially separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for creating a distance dependent display, comprising:
    providing an image separating mask having a plurality precision slits arranged in a pattern set so as to create different parallel viewing windows at different viewing distances;
    generating an interlaced image that combines strips from a plurality of images according to said pattern; and
    combining said interlaced image and said image separating mask to create a distance dependent display that allows an observer to view substantially separately each of said plurality of images from one of a plurality of different viewing positions at a plurality of different distances along a virtual perpendicular to the face of said distance dependent display;
    wherein said plurality of images are interlaced so that image strips of each one of said plurality of images are viewed by both eyes of said observer via the same precision slits of said plurality of plurality precision slits of said image separating mask when said observer is in one of said plurality of different viewing positions.

2. The method of claim 1, wherein said pattern is irregular.

3. The method of claim 2, wherein said irregular pattern is selected from a group consisting of: an asymmetric pattern of opaque and transparent sub-areas, a pattern having opaque segments with variable widths, a pattern having transparent segments with variable widths, and a pattern in which the various segments having variable opacities.

4. The method of claim 1, wherein said plurality of precision slits comprises a member selected from the group consisting of linear slits, curved slits, annular slits, twisted slits, spiraling slits and/or kinked slits.

5. The method of claim 1, wherein said combining comprises attaching said interlaced image to a side of a transparent surface and said image separating mask to an opposing side of said transparent surface.

6. The method of claim 1, wherein said providing comprises arranging said plurality of precision slits according to a binary image.

7. The method of claim 1, wherein each said image having at least one of a different hue and a different color, wherein the hue perceived from each said distance is different.

8. The article of claim 1, wherein said observer views substantially separately each of said plurality of images with both eyes.

9. A distance dependent display, comprising:
    an image separating mask having a plurality of precision slits arranged in a pattern set so as to create different parallel viewing windows at different viewing distances; and
    an interlaced image that combines strips from a plurality of images, each said image being interlaced to match said pattern;
    wherein said interlaced image and said plurality of precision slits are aligned to allow an observer to view substantially separately each said image from one of a plurality of different viewing positions at a plurality of different distances from said image separating mask along a virtual perpendicular to the face of the distance dependent display such that each said image is substantially separately viewed by said observer from another of said plurality of different distances;
    wherein said plurality of images are interlaced so image strips of each one of said plurality of images are viewed by both eyes of said observer via the same precision slits of said plurality of plurality precision slits of said image separating mask when said observer is in one of said plurality of different viewing positions.

10. The distance dependent display of claim 9, further comprising a transparent surface, said transparent surface said interlaced image and said image separating mask being attached to opposite sides of said transparent surface.

11. The distance dependent display of claim 10, further comprising an attachment element for attaching the distance dependent display to a window.

12. The distance dependent display of claim 10, wherein said image separating mask comprises a member of a group consisting of: a parallax barrier, a grating, and an optical barrier.

13. The distance dependent display of claim 10, wherein said image separating mask is an optical barrier, said plurality of precision slits comprising a member of a group consisting of lenticular lenses, diffractive elements, and lenses for integral photography.

14. A method for creating an integral viewing sheet, comprising:
    providing an image separating mask having a plurality of precision slits arranged in a predefined pattern set so as to create different parallel viewing windows at different viewing distances that applies an estimated blur;
    interlacing strips from a plurality of images to form an interlaced image according to said predefined pattern, at least one of said interlaced image and plurality of images being processed according to said estimated blur; and
    creating an integral viewing sheet by fixating said image separating mask in parallel to said interlaced image;
    wherein said predefined pattern is set so that in each one of a plurality of different viewing positions at a plurality of different distances from the image separating mask, along a virtual perpendicular to the face of said distance dependent display, an observer views, by both eyes and via the same precision slits of said plurality of plurality precision slits of said image separating mask when said observer is in one of said plurality of different viewing positions, image strips of a different image of said plurality of images such that each said image is substantially separately viewed by said observer from another of said plurality of different distances.

15. The method of claim 14, wherein said predefined pattern is irregular.

16. The method of claim 15, wherein said irregular pattern is selected from a group consisting of: an asymmetric pattern of opaque and transparent sub-areas, a pattern having opaque segments with variable widths, a pattern having transparent segments with variable widths, and a pattern in which the various segments having variable opacities.

17. The method of claim 14, wherein said image separating mask has a transparent-opaque ratio of at least 1:1.

18. The method of claim 14, wherein said interlaced image comprises a plurality of strips, at least one of said plurality of precision slits being wider than each said strip.

19. An article for viewing images of an interlaced image, comprising:
- an image separating mask having a plurality of precision slits arranged in an irregular pattern set so as to create different parallel viewing windows at different viewing distances; and
- an interlaced image from strips of a plurality of images, each said image being interlaced to match said irregular pattern;
- wherein said interlaced image and said plurality of precision slits are combined to allow an observer to view substantially separately each said image from a respective of a plurality of a plurality of different viewing positions at a plurality of different distances from said image separating mask along a virtual perpendicular to the face of the article;
- wherein said plurality of images are interlaced so that said observer views, by both eyes and via the same precision slits of said plurality of plurality precision slits of said image separating mask, image strips of one of said plurality of images substantially separately from other of said plurality of images at each one of said plurality of different viewing positions such that each said image is substantially separately viewed by said observer from another of said plurality of different distances.

20. The article of claim 19, wherein said irregular pattern is selected from a group consisting of: an asymmetric pattern of opaque and transparent sub-areas, a pattern having opaque segments with variable widths, a pattern having transparent segments with variable widths, and a pattern in which the various segments having variable opacities.

21. The article of claim 19, further comprising a backlight element for illuminating interlaced image via said image separating mask, said interlaced image being positioned between said observer and said image separating mask.

* * * * *